(12) United States Patent
Bowden (10) Patent No.: US 12,117,055 B2
(45) Date of Patent: Oct. 15, 2024

(54) FRICTION DEVICE WITH REDUCED VOLUME

(71) Applicant: RFPC HOLDING CORP., Wilmerding, PA (US)

(72) Inventor: Alan Gary Bowden, Laurinburg, NC (US)

(73) Assignee: RFPC HOLDING CORP., Wilmerding, PA (US)

(*) Notice: Subject to any disclaimer, the term of this patent is extended or adjusted under 35 U.S.C. 154(b) by 127 days.

(21) Appl. No.: 17/511,051

(22) Filed: Oct. 26, 2021

(65) Prior Publication Data

US 2022/0042560 A1 Feb. 10, 2022

Related U.S. Application Data (63) Continuation-in-part of application No. PCT/US2020/037168, filed on Jun. 11, 2020.

(60) Provisional application No. 62/860,035, filed on Jun. 11, 2019.

(51) Int. Cl.
| | |
|---|---|
| *F16D 65/06* | (2006.01) |
| *F16D 69/02* | (2006.01) |
| *F16D 69/04* | (2006.01) |

(52) U.S. Cl.
CPC .......... *F16D 65/06* (2013.01); *F16D 65/062* (2013.01); *F16D 69/026* (2013.01); *F16D 69/0416* (2013.01); *F16D 2200/0065* (2013.01)

(58) Field of Classification Search
CPC ...... F16D 65/06; F16D 65/062; F16D 69/026; F16D 69/0416; F16D 2069/0466; F16D 2200/0065

USPC ........ 188/252, 253, 255, 261, 250 E, 250 G, 188/250 B, 264 R

See application file for complete search history.

(56) References Cited

U.S. PATENT DOCUMENTS

| | | | | |
|---|---|---|---|---|
| 543,273 | A | * | 9/1895 | Snow ...................... F16D 65/08 188/253 |
| 596,132 | A | * | 12/1897 | Allen ..................... F16D 65/062 188/254 |
| 717,620 | A | * | 1/1903 | Rawstron .............. F16D 65/062 188/252 |

(Continued)

FOREIGN PATENT DOCUMENTS

| | | | | |
|---|---|---|---|---|
| CN | 1219496 | A * | 6/1999 | ............... B66B 5/22 |
| CN | 1286189 | A | 3/2001 | |

(Continued)

OTHER PUBLICATIONS

Translation CN 1219496 A. (Year: 1999).*

(Continued)

*Primary Examiner* — Thomas J Williams
(74) *Attorney, Agent, or Firm* — K&L Gates LLP (57) ABSTRACT

A method and a system of a friction device for a wheel may include a backing plate and a friction material disposed on the backing plate to form a brake surface to engage a surface of the wheel. The friction material extends between a first end and a second end along a central longitudinal axis, and between a rim side and a flange side. A void is disposed within the friction material and extends from the brake surface a distance into the friction material. The void forms an opening of the brake surface of the friction material.

17 Claims, 6 Drawing Sheets

(56) References Cited

U.S. PATENT DOCUMENTS

| | | | | |
|---|---|---|---|---|
| 720,167 | A | * | 2/1903 | Meehen ............... F16D 65/08 188/253 |
| 737,185 | A | * | 8/1903 | Willhide ....................... 188/261 |
| 837,356 | A | * | 12/1906 | Streeter ............ F16D 65/062 188/252 |
| 1,046,360 | A | * | 12/1912 | Worswick ........... F16D 65/062 188/252 |
| 1,142,380 | A | * | 6/1915 | Streeter ............ F16D 65/062 188/255 |
| 1,218,668 | A | * | 3/1917 | Jones ............... F16D 65/062 188/252 |
| 1,308,402 | A | * | 7/1919 | Dickinson .......... F16D 65/062 188/252 |
| 2,162,770 | A | * | 6/1939 | Wilson ............... F16D 65/062 188/73.1 |
| 2,741,340 | A | * | 4/1956 | Newell .............. F16D 65/062 188/256 |
| 2,763,059 | A | * | 9/1956 | Caton ................ F16D 65/062 29/521 |
| 2,885,037 | A | * | 5/1959 | Wilson ............... F16D 65/062 188/258 |
| 5,341,904 | A | * | 8/1994 | Christie ............. F16D 65/062 188/251 R |
| 6,241,058 | B1 | | 6/2001 | Shute et al. |
| 6,581,732 | B1 | * | 6/2003 | Shute ................ F16D 65/062 188/242 |
| 8,235,185 | B2 | * | 8/2012 | Formolo ............. F16D 69/00 188/250 R |
| 2002/0079174 | A1 | | 6/2002 | Shute et al. |
| 2003/0234142 | A1 | | 12/2003 | Shute et al. |
| 2003/0234143 | A1 | | 12/2003 | Shute et al. |
| 2022/0042560 | A1 | * | 2/2022 | Bowden ................. B61H 1/00 |
| 2022/0042561 | A1 | * | 2/2022 | Bowden ............... F16D 65/062 |

FOREIGN PATENT DOCUMENTS

| | | | |
|---|---|---|---|
| CN | 101900176 | A | 12/2010 |
| CN | 205298337 | U | 6/2016 |
| GB | 772989 | A | 4/1957 |
| GB | 821293 | A | 10/1959 |
| JP | 2012189175 | A | 10/2012 |
| JP | 2019019948 | A | 2/2019 |
| KR | 2019870012463 | U | 8/1987 |
| KR | 20060016148 | A | 2/2006 |
| RU | 2309072 | C1 | 10/2007 |
| RU | 79628 | U1 | 1/2009 |
| RU | 2381934 | C1 * | 2/2010 |
| RU | 94652 | U1 | 5/2010 |
| RU | 2428599 | C1 | 9/2011 |
| RU | 2504703 | C2 | 1/2014 |
| WO | 2007012457 | A1 | 2/2007 |
| WO | 2019083401 | A1 | 5/2019 |
| WO | 2019083402 | A1 | 5/2019 |
| WO | 2019088874 | A1 | 5/2019 |

OTHER PUBLICATIONS

Translation RU 2381934 C1. (Year: 2010).*
International Preliminary Report on Patentability mailed 23-Dec. 2021 for corresponding International application No. PCT/US2020/037168 (10 pages).
Office Action mailed Feb. 21, 2023 for corresponding Chinese Patent Application No. 202080040474.2. English translation provided. (25 pages).
International Search Report and Written Opinion mailed Sep. 25, 20202 for corresponding International application No. PCT/US2020/037168 (13 pages).
Office Action for corresponding EA Application No. 202191865 dated Sep. 23, 2022 (6 pages).
Second Office Action mailed Jun. 13, 2023 for corresponding Chinese Patent Application No. 202080040474.2. English translation provided. (32 pages).
Office Action mailed Aug. 30, 2023 for corresponding Chinese Application No. 202080040474.2 (27 pages).
Office Action for corresponding EA Application No. 202391433/31 dated Jun. 29, 2023 (7 pages).
Office Action mailed Nov. 9, 2023 for corresponding Chinese Application No. 202080040474.2 English translation provided. (27 pages).

* cited by examiner

FRICTION DEVICE WITH REDUCED VOLUME

CROSS-REFERENCE TO RELATED APPLICATIONS

This application is a bypass continuation-in-part of and claims priority to International Patent Application No. PCT/US2020/37168 (filed 11 Jun. 2020), which claims priority to U.S. Provisional Application No. 62/860,035 (filed 11 Jun. 2019). The entire disclosures of these applications are incorporated by reference herein.

BACKGROUND

Technical Field

The subject matter described herein relates to a friction device, such as a brake shoe, having a controlled, reduced volume of friction material.

Description of Art

Various types of friction devices (e.g., brake shoes) having different compositions are used to achieve specific braking requirements. For example, these compositions may include cast iron and other types of friction materials that may be specifically formulated for a number of predetermined applications. These various types of friction materials may exhibit a number of uniquely different friction characteristics upon a wheel of a vehicle, specifically the wheel tread.

Braking applications, as well as contact between a wheel of a vehicle and a route, may lead to surface defects of the wheel. These surface defects may include shells, spalls, pits, generalized corrosion, cracks, flats, as well as uneven and hollow wheel wear. Conditioning a wheel tread may reduce an amount of one or more surface defects.

As one example, hollow wheel wear may refer to a wheel tread that has an amount of wear near a center of the wheel tread that is greater than an amount of wear near the rim or "field side" of the wheel. Mitigating hollow wheel wear may extend the life of a wheel that is in service. Hollow wheel wear may be measured by comparing the wheel tread along the rim of the wheel with the wheel tread near or proximate to the center of the wheel. A thickness of height of the wheel tread may be measured between a center portion or interior portion of the wheel tread and an outer portion of the wheel tread surface. The difference in height between the wheel tread surface near the rim and the wheel tread surface near the center of the wheel may indicate an amount of wear to the wheel tread. As one example, the center of a wheel of a rail vehicle may see a greater amount of wear relative to other areas of the wheel as the wheel tread near the center of the wheel directly contacts the rail during operation. For example, wear of the wheel tread near the center of a rail wheel may outpace the wear of the wheel at the rim. The diameter of the wheel near the center of the wheel tread may become smaller at a faster rate relative to the diameter of the wheel tread near the rim. By reducing hollow wheel wear, the lifespan of the wheel can be increased. Friction devices may provide inadequate friction levels for braking applications, may spark during brake applications, or may include aggressive grinding type material.

For example, PCT Patent Application No. PCT/RU2018/000340 describes a brake shoe for a railway vehicle that includes a polymer composite friction element, a metal casing, and a wrought iron insert. The weight of the wrought iron insert corresponds to 18%-30% of the weight of the brake shoe which affects the distribution of heat between the wheel and the brake shoe, the coefficients of the braking efficiency, and the effective volume of thermal absorption.

As another example, PCT Patent Application No. PCT/RU2018/000339 describes a brake shoe for a railway vehicle that includes a polymer composite friction element, a metal casing, and a wrought iron insert. The weight of the wrought iron insert corresponds to 59-90% of the weight of the brake shoe which affects the functional characteristics of the jaw.

As another example, PCT Patent Application No. PCT/RU2018/000337 describes a brake shoe for a railroad vehicle that includes a metal frame, a polymer composite friction element, and a metal insert. Depressions are made on the surface of the friction element in zones (such as groves, openings on the side of the inserts between the insert and a friction material) ostensibly to affect a possibility of the polymer composite of the friction element crumbling within the zones where said element interfaces with the insert.

As another example, Russian Patent No. RU2504703 describes a friction material for an automobile brake pad that includes a carrier material with high open porosity which is wetted by a binder, and onto which a functional substance is applied or introduced. The residual moisture after drying may be from 0.3% to 5%. Suitable carrier materials were those materials which have a specific surface area of from 20 $m^2/g$ to 80 $m^2/g$. The carrier material preferably has a grain size of from 90 µm to 1.5 mm, which ensured workability of the friction material. The mixing of the carrier material and the binder occurs with a surface velocity of particles of 5 m/s to 50 m/s. In a specific example, a friction material was produced that has 3990 parts of carrier material with 2100 parts of a binder (e.g. water and hydrated sodium silicate in a 1:1 ratio). Then 350 parts of molybdenum sulfide, 490 parts of a multi-component lubricant containing, for example, iron sulfide II, zinc sulfide II and/or titanium sulfide IV, as well as 140 parts of zinc sulfide II, were added.

As another example, Russian Patent No. RU2309072 describes a brake shoe that includes a metal skeleton with a U-shaped projection in its central part, a composite friction member, and an insert. The insert is arranged in a central part of the shoe and may be welded to the metal skeleton. The insert is made of high strength or malleable cast iron. A ratio of an area of a working surface of the insert to a total area of a working surface of the brake shoe is in a range of from about 4% to 20%.

As another example, Russian Patent No. RU2428599 describes a friction item that includes a metal frame with holes and of friction element with protrusions or lugs molded onto it. The friction element is made of polymer friction composite and is disposed so that the lugs are arranged inside of the holes. The hardness of composite in lugs is less than in a working part of the friction element.

It may be desirable to have a friction device that differs from those that are currently available.

BRIEF SUMMARY

In one example, a friction device for a wheel is provided. The friction device may include a backing plate and friction material disposed on the backing plate to form a brake surface configured to engage a surface of the wheel. The friction material may extend between a first end and a second end along a central longitudinal axis, and between a rim side and a flange side. The friction device also may include a void disposed within the friction material and extending from the brake surface a distance into the friction material. The void may form an opening of the brake surface of the friction material.

In another example, a friction device for use on a vehicle includes a backing plate adapted to interface with a brake head of the vehicle, a friction material operably coupled with the backing plate to form a brake surface that engages a wheel of the vehicle, and a conditioning insert disposed at least partially within the friction material. The conditioning insert can include a conditioning surface configured to face the wheel. The conditioning surface may include a material that is different than the friction material. The friction device also may include a void disposed within the friction material and extending from the brake surface a distance into the friction material. The void may form an opening of the brake surface of the friction material.

In one example, a method is provided that includes engaging a brake surface of a friction material with a wheel surface of a wheel to slow or stop movement of the wheel, and disengaging the brake surface of the friction material with the wheel surface at a void disposed within the friction material and extending from the brake surface a distance into the friction material. The void may form an opening of the brake surface of the friction material.

BRIEF DESCRIPTION OF THE DRAWINGS

The inventive subject matter may be understood from reading the following description of non-limiting examples, with reference to the attached drawings, wherein below.

DETAILED DESCRIPTION

One or more examples of the inventive subject matter described herein provide a friction device for use on a vehicle. In one or more examples, the friction device can be, or may be referred to as, a brake shoe. A suitable vehicle may be a railway vehicle in one embodiment. The friction device may include a bonded insert and a friction structure formed of a friction material. The friction structure may have a reduced volume relative to a traditional brake pad. In one example, a friction device may be provided that includes a backing plate, a friction material disposed on the backing plate to form a brake surface, and at least one void disposed within the friction material. The void may be an opening of the brake surface of the friction material.

During use, the friction device may engage the brake surface of the friction material with a wheel surface of a wheel to slow or stop movement of the wheel. An amount of wear of the wheel surface of the wheel may be controlled and/or reduced by the one or more voids in the friction material relative to a friction device without voids in the friction material. As one example, the one or more voids may be openings of the brake surface of the friction material such that the wheel surface may not contact the brake surface of the friction material at the one or more voids or the brake surface of the friction material may disengage from the wheel surface at the one or more voids. As another example, the brake surface of the friction structure may include and/or be made of a first material, and a portion of the voids may be filled with a different, second material such that the wheel surface may contact the first material (e.g., the friction material) at the brake surface and outside of the voids, and may contact the second material at the voids.

Figure 1:
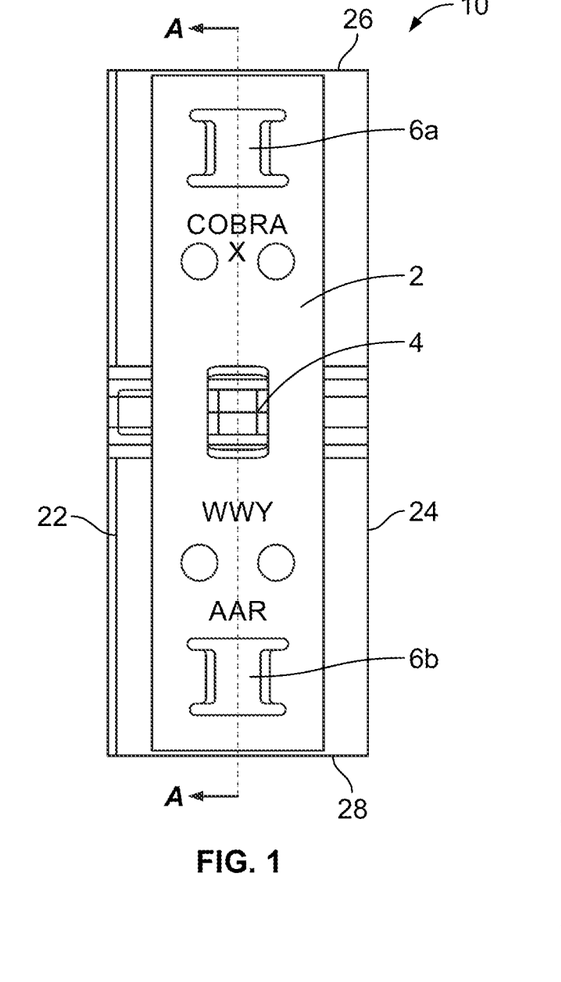
FIG. 1 is a top view of a friction device according to one aspect of the invention.
Figure 2:
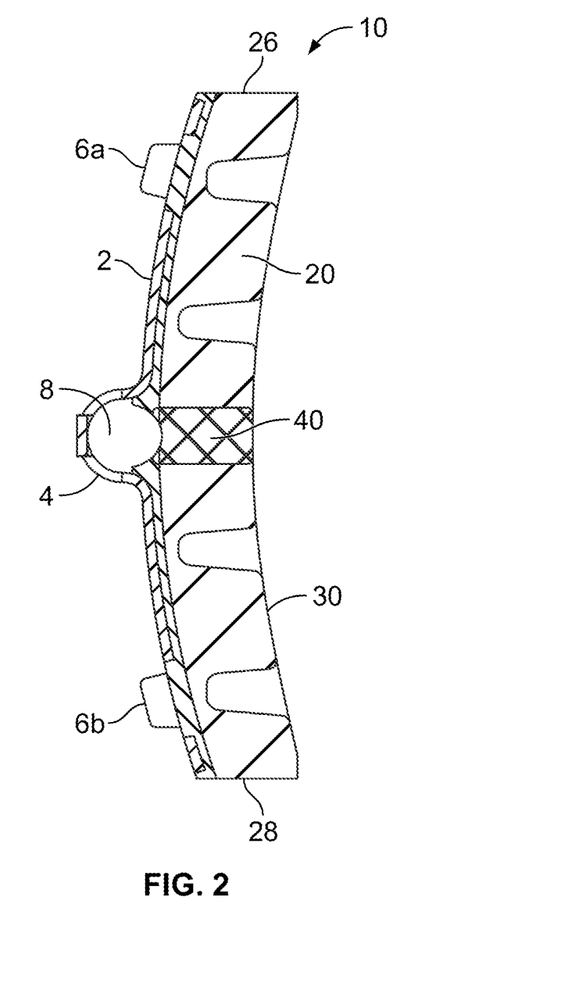
FIG. 2 is a cross-sectional side view of the friction device shown in FIG. 1 along line A-A.
Figure 12:
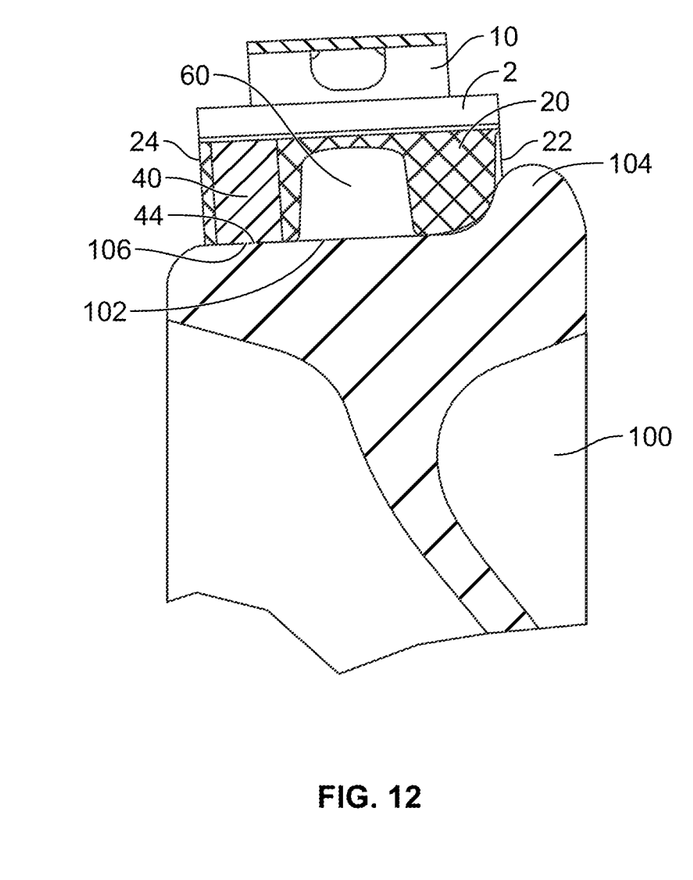
FIG. 12 is a cross-sectional side view of a friction device coupled with a wheel of a vehicle according to one example.

Referring to FIGS. 1, 2, and 12, a friction device 10 in accordance with at least one example of the inventive subject matter is illustrated. The friction device may include a backing plate 2. In the illustrated example, the backing plate has a substantially arcuate shape so as to permit the friction device to interact with a wheel tread or wheel surface 102 of a wheel of a vehicle (shown in FIG. 12). In the illustrated example, a steel railway vehicle is contemplated. The friction device may include a keybridge 4. The backing plate may include one or more rejection lugs 6a, 6b. An opening 8 in the keybridge may accept a locking key (not shown) which fastens the friction device to the vehicle brake head. The friction device may include a friction structure 20. At least a part or portion of the friction structure may be made of a composite friction material. The friction structure of the friction material may include a flange side 22 facing toward a flange 104 of a wheel 100, a rim side 24 facing toward a rim 106 of the wheel, and first 26 and second 28 opposing ends. The flange and rim sides may extend along the length of the friction device, and the opposing ends may extend between and connect the flange and rim sides. A central longitudinal axis I-I (see FIGS. 3-9) substantially bisects the friction device between the flange side and the rim side. The friction material forms a brake surface 30 or working surface of the friction device.

Suitable backing plates may be made of metallic material or non-metallic material, or a combination or composite material. Suitable metallic materials may include iron and iron alloys. Suitable iron alloys may include steel. In one example, the backing plate may be made of a reinforced composite material. The backing plate may be coated. Suitable coatings my include galvanic coatings (particularly if the backing plate is formed of a corrodible metal), paint, and anodized layers. Suitable paints include enamel, epoxy, and powder coatings. The backing plate may be curved axially so as to follow the curvature of a wheel. The axis for the curve may be a wheel axis. In one example, the friction structure is curved and is coaxial to the wheel, while the backing plate follows the curve of the friction structure to be coaxial to the wheel. In another example, the backing plate is curved but is not coaxial with the wheel or with the working surface of the friction structure. The degree of separation of the curvature of the backing plate relative to the friction structure may be selected based on application specific parameters.

The backing plate may have surfaces that are relatively smooth, and may have one or more defined apertures therethrough and/or protrusions extending therefrom. In one example, the backing plate is undulate so as to increase its surface area. An increased surface area may provide more bonding surface to which the friction structure may bond. The undulations may be dispersed evenly across the backing plate, or may be patterned so that some undulations are at a proximate edge or some undulations are concentrated nearer the center line. The undulations may run the length of the backing plate, or may be oriented width-wise. Undulations may impart stiffness in the direction of their run, and flexion perpendicular to their run. In one example, the undulations direction is skew relative to the length and the width of the backing plate. In one example, a checkered pattern or equivalent is present to allow for control over the stiffness and the flexion of the backing plate while still increasing the surface area. Various patterns and similar effects can be created by selecting either a uniform thickness of the backing plate (and thus by bends in the plate) or by using non-uniform thicknesses across the backing plate.

In one example, the width of the backing plate is the same as the width of the friction structure. In another example, the width of the backing plate differs from the width of the friction structure. A backing plate that is smaller than the width of the friction structure may be sufficient to perform the support function of the backing plate, while reducing overall weight and/or cost. A backing plate that is larger than the width of the friction structure may be sufficient to perform the support function of the backing plate, while providing enhanced support to edges of the friction material. In one example, the width ratio of the backing plate to the friction structure, the length ratio of the backing plate to the friction structure, and the ratio of the backing plate's thickness to a starting thickness of the friction structure is, independently of each other, in a range of less than about 0.5, in a range of from about 0.6 to about 0.9, about 1, in a range of from about 1.1 to about 1.2, in a range of from about 1.2 to about 1.5, or in a range of greater than about 1.6. Suitable backing plate configurations may include a full unbroken plate, a mesh, a wire form, a reinforced wire form, a mesh, or a molded composite.

In one example, the width of the brake shoe's friction structure's working surface relative to the wheel tread (which includes at least a portion of the wheel flange that touches the brake shoe during use) is in a range of less than about 35%, in a range of from about 36% to about 50%, in a range of from about 51% to about 75%, in a range of from about 76% to about 100%, or greater than about 101%. A suitable brake shoe width may vary from side to side or from end to end. A suitable shape of the friction structure may follow a contour of wheel, having a matching complimentary profile. This shaped edge may be formed with one or more of a chamfer, ridge, edge, or radius. In one example, only one edge of the friction structure is contoured. In another example, both edges are contoured to allow for installation in either orientation. In one example, the brake shoe is configured to fit to a new railway vehicle wheel having a diameter in a range of less than about 600 mm, in a range of from about 601 mm to about 1300 mm, or in a range of greater than about 1301 mm.

A pair of the rejection lugs are shown in the illustrated example. The rejection lugs may be integrally formed with the backing plate and may extend from a top surface of the backing plate. The rejection lugs may be sized and positioned in such a way so as to mate with corresponding rejection lug receptacles (not shown) on a corresponding brake head (not shown). In one example, the rejection lugs may be compatible with a variety of brake heads. In one example, the lugs may only correspond with a certain type of brake head in order to prevent the installation of the brake shoe on an improper brake head; or may be reversibly installable to prevent mis-installation; or may be designed so as to only fit with the brake head to insure it is only possible to install in the correct orientation.

In one example, the keybridge may be integrally formed with the backing plate or it may be attached to the backing plate prior to installation. The keybridge may be formed of materials similar or the same as the backing plate, discussed above. The keybridge may be coupled to a brake head (not shown) of a vehicle. In one example, the keybridge may be circular. Based at least in part on application specific parameters, another keybridge may be shaped to facilitate fastening of the keybridge to the brake head. Suitable coupling methods for the keybridge include welding, mechanical fastening, press or friction fitting, and the like.

An example of a suitable friction structure is a brake pad. The brake pad may be useful to slow or stop a vehicle. Suitable vehicles may include automobiles, trucks, busses, mining equipment, aircraft and railway vehicles. Railway vehicles may include locomotives and railcars, and may be for transport of freight and/or passengers. The friction structure may be formed of a composition friction material.

In one example, a suitable friction material is rated for a Rubbing Pressure (RP) in a range of less than about 800 N/cm$^2$, in a range of from about 801 N/cm$^2$ to about 1000 N/cm$^2$, in a range of from about 1001 N/cm$^2$ to about 1500 N/cm$^2$, or greater than about 1501 N/cm$^2$. In one example, a suitable friction material is rated for a Rubbing Speed (RV) in a range of less than about 20 m/s, in a range of from about 21 m/s to about 30 m/s, in a range of from about 31 m/s to about 50 m/s, or greater than about 51 m/s. In one example, a suitable friction material is rated for Continuous Temperature operation (CT) in a range of from about 300° C. to about 350° C., from about 351° C. to about 400° C., from about 401° C. to about 450° C., or greater than about 451° C. In one example, a suitable friction material is rated for Short Term Temperature (ST) in a range of from about 500° C. to about 600° C., from about 601° C. to about 700° C., from about 701° C. to about 800° C., from about 801° C. to about 900° C., or greater than about 901° C. The preceding ranges are based at least in part on, and determined by, the friction material selection, the physical configuration, and the end use application of the friction device.

In other examples, a suitable friction structure may include be semi-metallic. Semi-metallic may include a non-metallic matrix, such as a ceramic or a polymer, with a metallic filler. For example, a semi-metallic puck of iron or copper powder may be bound together by a ceramic or polymer. The fill content may be selected based at least in part on the desired performance of the friction material and friction structure made therefrom. Suitable filler content may be expressed as a ratio of metallic material to matrix material by volume or by weight. In various examples, a suitable ratio may be in a range of less than 50% by weight, in a range of from about 51% to about 75% by weight, from about 76 to about 90% by weight, or greater than 91% by weight. For example, a suitable formulation may be 90 grams of metal per 10 grams of matrix. In various examples, the fill content for the friction structure may be metal, as disclosed, a non-metal, or a combination of metal and non-metal materials.

The ceramic/iron materials may be mixed, compressed and/or sintered at a high temperature to form a solid friction structure. Suitable binding or matrix materials may include one or more of resin (such as phenol formaldehyde), graphite (which can also serve as a friction material, zirconium silicate and the like. An example formulation, including binder, is shown in Table 1.

| Constituent | Approx. range % by weight |
|---|---|
| Aluminum Silicate | 25-35 |
| Bronze particles | 10-20 |
| Graphite | 5-15 |
| Vermiculite | 10-20 |
| Phenolic resin | 10-20 |
| Steel fibers | 3-7 |
| Rubber particles | 3-7 |
| Silicon dioxide particles | 1-5 |
| Aramid fibers | 1-5 |

The powder size, fiber size, concentration distribution, grain size distribution, and morphology may be selected or controlled to affect performance of the friction structure. If the fill content is a powder, suitable powder size averages may be in a range of less than 100 micrometers, in a range of from about 101 micrometers to about 250 micrometers, in a range of from about 251 micrometers to about 500 micrometers, or greater than about 501 micrometers. The grain size distribution may be in a range of from about 0.5 to about 1, from about 1 to about 2, or greater than about 2 as a distribution relative to mean particle size. The morphology of the particles may be selected from suitable shapes. Suitable shapes may include spherical, ovoid, irregular, flake, and polygonal. In some examples the more surface area of the particle, the lower the friability of the friction structure; and in other examples, the more edged particles provide relatively more aggressive friction and conditioning than the smoother or rounder particles. The hardness of the material selected as the filler powder, in combination with the filler content, and particle morphology can contribute to the performance of the friction structure. If the fill content is a fiber, the fiber thickness and fiber length may be selected or controlled to affect performance. The fiber may be the same material as the powder fill content, and the fill content may be a mixture of powder and fiber in one example. Other suitable fibers may be formed from an aromatic polyamide or aramid, such as Kevlar™, Twaron™, Nomex™, and Technora™. Other suitable fibers may be formed from an aliphatic or semi-aromatic polyamides, such as Nylon™. Polymeric fibers may include one or more copolymers to control and affect crystallinity, melting or softening points, and the like. The length of the fibers may be controlled to affect performance. Suitable fiber lengths may be in a range of less than about 1 millimeter (mm), in a range of from about 1.1 mm to about 2 mm, in a range of from about 2.1 mm to about 5 mm, or in a range of greater than about 5.1 mm. Fiber thickness may be selected to control and affect performance. Suitable fiber thickness may be in a range of from about In one example, the fibers have a Denier in a range of less than about 20 d, in a range of from about 21 d to about 100 d, in a range of from about 101 d to about 500 d, in a range of from about 501 d to about 1500 d, in a range of from about 1501 d to about 3000 d, or greater than about 3000 d selected based at least in part on application specific parameters.

Suitable polymer or polymeric matrices may include phenolics, urea-formaldehyde, epoxy, cyanate ester, aromatic heterocyclics (such as Polyimides, polybenzoxazoles (PBOs), polybenzimidazoles, and polybenzthiazoles (PBTs)), inorganic and semiorganic polymers (such as may be derived from silicon-nitrogen, boron-nitrogen, and phosphorus-nitrogen monomers), and silicon-based polymers, as well as mixtures and copolymers of the foregoing. The polymeric matrix, along with other additives, may include a flame retardant. Suitable flame retardants may include a composition that includes one or more of aluminum, phosphorus, nitrogen, antimony, chlorine, bromine, and in some applications magnesium, zinc and carbon.

A suitable friction structure may be affixed to and extends from the backing plate along the surface opposite the rejection lugs and key bridge. In one example, to be affixed to the backing plate the friction structure may include an adhesion layer (not shown) to facilitate proper fixture to the backing plate. In one example, the friction material is affixed via mechanical means with, or without, an adhesive layer. The friction structure may be affixed to the backing plate by means that may be selected based at least in part on the application specific parameters.

A suitable friction structure may include an outer layer that is the first to contact a wheel surface when newly installed. This outer lay may perform one or more of the following functions: prevent exposure of the friction material during storage, transport or installation to corrosion, chipping, moisture or fouling; provide an initial coating to the wheel surface on the first few rotations after installation and braking to condition or treat the wheel surface; to condition the wheel surface and remove any debris or corrosion; to fill in cracks, pits and defects in the wheel surface; and the like. In one example, the outer layer is removed from the working surface of the friction structure through friction in the first few rotations during braking after installation. In one example, the outer layer is peeled off after installation or a part of the installation process.

The brake surface of the friction structure may contact the vehicle wheel tread to apply a braking force to the vehicle. In one example, the brake surface may contact a portion of the vehicle wheel flange and/or wheel rim. In one example, the brake surface may contact all of the flange and all of the rim. In one example, the wheel tread, wheel flange, and wheel rim may be all parts of the wheel surface or wheel tread surface to which the brake shoe may be applied. Contact to the wheel flange and wheel rim still applies a braking force to the vehicle, however, contact on these parts of the wheel serve to prevent hollow wheel wear. The friction structure takes the arcuate shape of the backing plate so as to interact against a vehicle wheel or wheel tread. In one example, the brake surface may take the arcuate shape of the backing plate. The friction structure may provide the required friction and braking effort when forced against the wheel or the wheel tread.

The friction structure may include one or more wear indicators. In one example, the wear indicators are molded into the friction material of the friction structure. A suitable location for the wear indicator is at the back of the shoe. Depending on the embodiment, the backing plate itself may be the wear indicator or may have material removed to allow a wear indicator to become visible. Other suitable locations for wear indicators may include proximate to an end, around a periphery, at the centerline of the friction structure, at an distal end (or both ends) of the friction structure, as a part of a conditioning insert, or the like. During use, the wear indicators allows an observer to determine useful life of the friction structure. In one example, a groove is formed in the friction structure from the working surface down to a determined depth. During use, the depth of the groove diminishes as the working surface is worn away. An observer would then look for the groove and determine life by its remaining depth (or absence if it was at end of life and completely worn away). Other examples of wear indicators may include a differently colored portion of the friction structure. Or, the conditioning insert can be configured to perform the wear indication function. In one example, an RFID chip (or equivalent) is disposed in the friction structure at the depth for which the end of life is set for the friction structure. When the friction structure is worn to expose the RFID chip, the chip will no longer function and provide a signal in response to a query (for passive chips, active chips may broadcast signals and the absence of a broadcast signal would indicated end of life). Naturally, an RFID sensor would communicate with the wear indicator chip and thereby one could determine when a brake change was needed.

Figure 3:
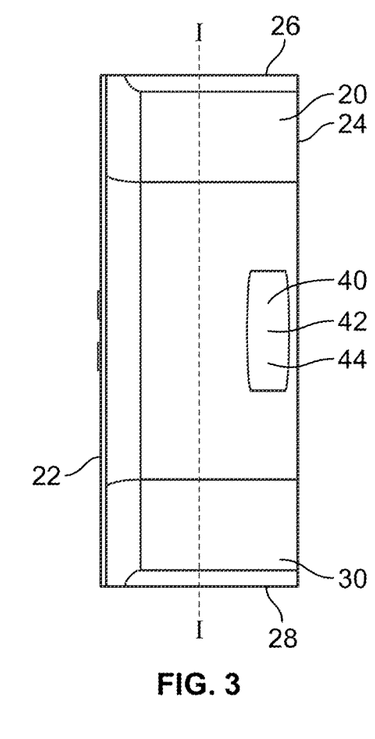
FIG. 3 is a bottom view of a friction device according to one example.
Figure 4:
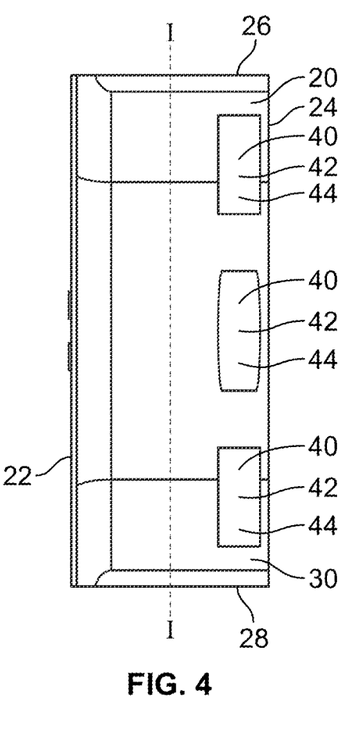
FIG. 4 is a bottom view of a friction device according to one example.

Referring to FIGS. 2-12, at least one conditioning insert 40 may be disposed in the composite friction material of the friction structure. Examples of the conditioning insert may have selected shapes and be disposed within the friction structure. These shapes may be influenced and/or dictated by application specific parameters. As one example, the conditioning insert may include an elongated portion 42. As shown in FIGS. 3 and 4, the elongated portion has a conditioning surface 44 and extends along the brake surface adjacent to and substantially parallel with the rim side of the friction structure. In this configuration, the conditioning surface of the conditioning insert may be in a position to control an amount of wear of a wheel tread proximate to the rim of a wheel of a vehicle.

In one example, the conditioning insert may be disposed at least partially within the friction structure with the conditioning surface exposed to and substantially flush with the brake surface. In other examples, the insert may be fully encapsulated within the friction structure of the brake shoe. In instances where the composite friction material fully surrounds and encapsulates the conditioning insert, repeated braking of the vehicle may wear away the composite friction material eventually exposing the conditioning surface of the conditioning insert to the wheel of the vehicle. In one example, the conditioning surface may be arcuate in shape so as to permit conditioning of the vehicle wheel. Depending on its alignment with the wheel rim, the conditioning surface may be shaped to condition the rim of a wheel.

A conditioning insert material and other parameters may be selected with reference to the conditioning function and the friction material may be selected with reference to the braking or friction function. Thus, they may contain similar materials in some examples, but the compositions differ such to perform their intended function. This difference may be substantial (e.g., a metal conditioning insert within a composite friction structure) or may be relatively subtle (e.g., both are ceramic iron metal-filled structures, with one having a different concentration of metal content). In one example, the conditioning insert may be formed of a material relatively harder and/or more abrasive than the friction structure. For example, the wheel conditioning insert may be formed of a material with suitably abrasive properties for the wheel conditioning insert. As the brake shoe may be applied to the surface of a wheel, the wheel conditioning insert rubs against the wheel surface. The abrasive properties of the insert conditions the wheel surface to prevent, reduce, or remove defects.

A suitable wheel conditioning insert may be formed from a relatively hard material. Suitable materials may be metal. Suitable metal may include one or more of Al, Si, P, S, Cl, Ti, V, Cr, Mn, Fe, Co, Ni, Cu, Zn, Mo, Sn, Sb, Tl, and oxides, carbides, and alloys of the foregoing. In one example, the metal is iron or an iron alloy. Suitable iron, and iron alloys, may include those as used in, and process to form, cast iron, forged iron, wrought iron and the like. Suitable cast iron may include malleable cast iron or ductile cast iron. Other suitable iron inserts include treated iron, regardless of its manufacturing process. Suitable treated irons may include phosphated iron, nitrided iron, heat treated iron, and the like. Some steels may be used in various examples. The steel may have controlled amounts of carbon and/or chromium, as well as a controlled ratio of martensite relative to cementite structure. Selecting the alloy content may control the hardness, and therefore the performance of the conditioning insert. In other examples, the conditioning insert may include a non-ferrous metal.

In other examples, a suitable conditioning insert may include a non-metallic matrix, such as a ceramic or a polymer, preferably with a metallic filler. For example, a puck of iron powder or iron filling filled ceramic may be used. The iron may be the same, or different, from the identified suitable iron types. The fill content may be selected based at least in part on the desired performance of the conditioning insert. Suitable filler content may be expressed as a ratio of metallic material to matrix material by volume or by weight. In various examples, a suitable ratio may be in a range of less than 50% by weight, in a range of from about 51% to about 75% by weight, from about 76 to about 90% by weight, or greater than 91% by weight. For example, a suitable formulation may be 90 grams of iron powder per 10 grams of ceramic matrix. The ceramic/iron materials may be mixed, compressed and sintered at a high temperature to form a solid conditioning insert. The powder size and grain size distribution may be controlled to affect performance, as well. Suitable powder size averages may be in a range of less than 100 micrometers, in a range of from about 101 micrometers to about 250 micrometers, in a range of from about 251 micrometers to about 500 micrometers, or greater than about 501 micrometers. The grain size distribution may be in a range of from about 0.5 to about 1, from about 1 to about 2, or greater than about 2 as a distribution relative to mean particle size. The morphology of the particles may be selected from suitable shapes. Suitable shapes may include spherical, ovoid, irregular, flake, and polygonal. In some examples the more surface area of the particle, the lower the friability of the conditioning insert; and in other examples, the more edged particles provide relatively more aggressive friction and conditioning than the smoother or rounder particles. The hardness of the material selected as the filler powder, in combination with the filler content, and particle morphology can contribute to the performance of the conditioning insert. In one example, the wheel conditioning insert may be formed of a material relatively harder and/or more abrasive than the friction material. For example, the wheel conditioning insert may be formed of a material with suitably abrasive properties for the wheel conditioning insert. As the brake shoe may be applied to the surface of a wheel, the wheel conditioning insert rubs against the wheel surface. The abrasive properties of the insert conditions the wheel surface to prevent, reduce, or remove defects.

The conditioning insert may cover an area proximate to a rim side and/or a flange side of the friction device or brake shoe. The conditioning insert may cover or extend from a peripheral edge toward a center of the brake shoe. Suitable conditioning inserts may be positioned within the friction structure at a surface of the brake shoe that contacts the wheel surface, or may extend to a determined depth in the friction structure. In one example, the conditioning insert may extend through the friction structure from the brake surface to the backing plate. In one example, the conditioning insert may rub against the wheel rim to reduce hollow wheel wear as the wheel operates. The conditioning insert may condition the part of the wheel rim in contact therewith while rubbing. By providing the conditioning insert along the rim side of the wheel, responsive to the friction device engaging with the wheel, the conditioning surface may engage and wear at the wheel rim. As a result, the wheel rim may experience an amount of wear that is greater than an amount of wear the wheel rim otherwise would experience during operation of the vehicle. This additional wear may result in the diameter of the wheel along the rim decreasing at a rate closer to that of the diameter of the wheel along the tread. Because the diameters of the wheel along the tread and along the rim may be decreasing at more similar rates, the rate at which hollow wheel wear occurs becomes slower thus increasing the lifespan of the wheel.

As shown in FIG. 4, multiple conditioning inserts, each having an elongated portion, may be disposed along the rim side of the friction structure. Each conditioning insert includes a conditioning insert surface thereby providing multiple conditioning surfaces 44 to wear away at the wheel rim, thus further decreasing the difference in the rate of wear between the wheel tread and the wheel rim.

Although three rectangular wheel conditioning inserts are shown, other examples may have a different number of wheel conditioning inserts utilized along the rim side that is determine with reference to application specific parameters. Further, in other examples, these inserts may have a shape other rectangular and selected to condition the wheel rim. Other suitable shapes may be selected with reference to the desired performance, but polygonal and ovoid shapes may be broadly useful across use types. The wheel conditioning surface may remove imperfections from the wheel when in use and/or may impart a coating layer on the subsequently conditions surface. The shape of the insert, the number of inserts, the insert material, and other factors (such as volume, weight, density, and end use application) may be selected to achieve a desired and proportional effect from the insert.

Figure 5:
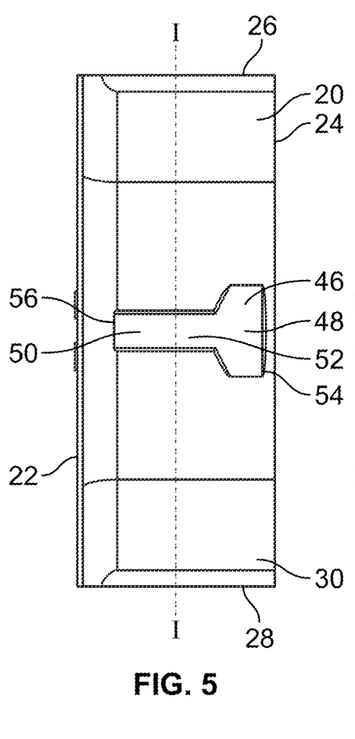
FIG. 5 is a bottom view of a friction device according to one example.
Figure 6:
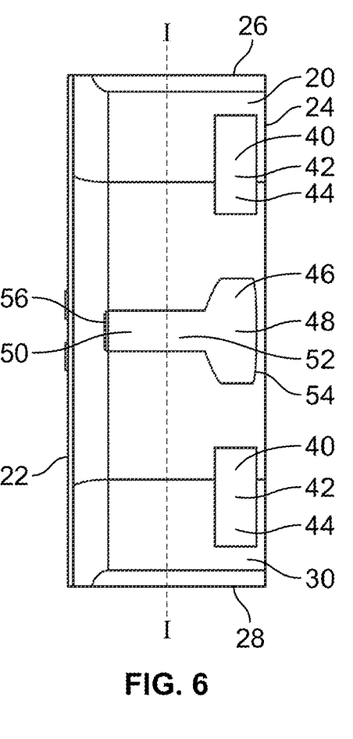
FIG. 6 is a bottom view of a friction device according to one example.

In one or more examples, the conditioning insert 46 may have a T-shape, such as illustrated in FIG. 5. The conditioning insert may have a first elongated portion 48 and a second elongated portion 50 both of which form a conditioning surface 52. The first elongated portion has an end 54 that extends along the brake surface adjacent to and substantially parallel with the rim side of the friction structure. The second elongated portion extends along the brake surface substantially perpendicular to the first elongated portion. The second elongated portion has an end 56 that may be adjacent to the flange side of the friction structure. In the illustrated example of FIG. 5, the central longitudinal axis I-I crosses the T-shaped conditioning insert substantially halfway between the end of the first elongated portion and the end of the second elongated portion. Alternatively, the T-shaped conditioning insert may be disposed at another location relative to the central longitudinal axis. With the first elongated portion adjacent to and extending along the rim side and the second elongated portion crossing the central axis I-I, the T-shaped conditioning insert may condition both the wheel tread and the wheel rim. This may condition the wheel tread, removing tread defects while simultaneously conditioning the wheel rim, removing rim defects and reduce a rate of hollow wheel wear.

To further reduce the rate of hollow wheel wear, one or more conditioning inserts may be disposed within the composite friction material of the friction structure along with the T-shaped conditioning insert. In other examples, more than two conditioning inserts may be disposed within the friction structure proximate the rim side to reduce an amount of hollow wheel wear. Other suitable shapes and configurations may include L-shaped, Y-shaped, and I-shaped inserts. The selection of the insert shape and configuration may be based at least in part on the end use application and other application specific parameters.

In one or more examples, the friction device may have plural conditioning inserts, and one or more of the inserts may have a shape and/or size that is different than a shape and/or size of one or more other inserts. For example, the friction device illustrated in FIG. 6 includes two rectangular shaped conditioning inserts and one T-shaped conditioning insert. The two rectangular inserts each have an elongated portion 42 disposed within the composite friction material along the rim side. The T-shaped conditioning insert is disposed between the two rectangular inserts along the central longitudinal axis, but alternatively the friction device may have an alternative number of conditioning inserts disposed in any alternative configuration. Additionally, the friction structure may include one or more voids 60 in the friction structure.

While the term "void" as used may sometimes indicate an entirely empty and hollow volume in some embodiments, in various other examples it may include materials other than the friction composite material. For example, the void may be filled with gas, a fluid, another material, etc., rather than a vacuum so as to be a true void. In examples where the void in the friction material is filled with a non-friction material filler material, suitable void filler materials may include metallic, inorganic and organic material. Suitable metallics include relatively softer metals. Example metals may include tin, zinc, lead, aluminum, copper and the like, as well as mixtures, oxides and alloys thereof. Suitable inorganic materials may include silicon and silicon-based oxides thereof; with yet other materials containing molybdenum or lithium in amounts and locations that lubricate and/or reduce wear. A suitable void filler may be a solid extreme-pressure and/or extreme-temperature lubricant. Suitable lubricants may include graphite and/or molybdenum disulfide to provide protection under heavy loadings. The solid lubricants may bond to the surface of the metal, and thereby reduce or prevent metal-to-metal contact and the resulting friction and wear when the lubricant film gets too thin. Solid additives such as copper or ceramic powder may be added to the lubricant for static high pressure and/or high temperature applications, or where corrosion might be a concern. These compounds may work as a release agent. Suitable organic materials may include carbon and polymeric materials.

The void filler polymeric materials can be homogeneous or can be composite or filled polymers. These filled polymers may include metals, such as that used for the conditioning insert, but in concentrations and/or morphologies that differ from the conditioning insert. In one or more examples, a metallic alloy of the filler material may be in an amount from about 5 percent to about 25 percent by weight. Alternatively, the filler material may comprise a metallic alloy and/or non-metallic alloys in alternative amounts. For example, in other examples, the filled polymers that constitute the void filler may include non-metallic aggregates such that the overall weight of the friction structure is less than one with no voids. If a relatively harder void filler is desired, particles such as silicon carbide, aluminum oxide or silicon oxide particles may be used. If a relatively softer void filler is used, then iron oxide or zinc oxide particles may be used. The selection of filler aggregate may include mixtures of different particles types, particle sizes, and particle size distributions. The binding agent may be selected, as well as the concentration of filler particles, to control and affect the action of the void filler and/or friction structure on the respective wheel surface, the overall weight of the friction structure, and the like.

The voids may constitute a varying amount of the working surface of the friction structure during the life of the brake device. In one example, the ratio of working surface (capable of contacting the wheel surface) and the cross sectional area of the void at the working surface is less than 5% (and in some cases zero at various life stages of the friction structure), in a range of from about 6% to about 10%, in a range of from about 11% to about 25%, in a range of from about 26% to about 50%, in a range of from about 51% to about 70%, in a range of from about 71% to about 80%, or in a range of greater than about 81%.

In one example, there may be more than one void. In one example, there may be less than about 50 voids. Note that the voids may be spaced at different thickness levels in the friction structure such that an unused friction structure has zero voids exposed, but a partially or fully used friction structure has some percentage of its working surface exposed as voids (absence of friction material). In one example, the voids are placed such that as the friction structure wears different locations of the wheel surface contact the friction structure owing to the void placement and thus exposure at that point in the life cycle. In one example, the voids define a channel that can run the length (or width) of the brake device. In some examples, the channel may operate to allow cooling air flow through the friction structure during use, and may provide an egress for particulate and/or water if such are present during use.

Suitable void shapes may be circular, ovoid or ovular, or elliptical in cross sectional profile or shape. Other suitable void shapes may include T-shaped and X-shaped. In one example, the void is shaped as a cone, a hemi-sphere, a full sphere, a cylinder, a cube or cuboid, a triangular prism, a triangular pyramid, a pentagonal prism, a pentagonal pyramid, a tetrahedron, a hexagonal pyramid, parallel piped, hexagon, other prism, a torus, an ellipsoid, an icosahedron, and the like. The voids may be shaped based at least in part on the specific end use parameters. Suitable shapes may be polygonal. In one example, the shape may be capable of reducing some of the volume of composite friction material in order to reduce the wear applied to the wheel tread. The void, as shown, may be conical or tapered, having a larger cross-sectional area at the brake surface which tapers or reduces to a smaller cross-sectional area nearest the backing plate. In one example, the void may have a volume that is less than 5 percent of the volume of the friction material. In another example, the void may have a volume that is between about 5 percent and about 50 percent of the volume of the friction material. In another example, the void may have a volume that is greater than about 50 percent and less than about 75 percent of the volume of the friction material. The void may be elongated in a direction perpendicular to the axis I-I. Orienting an elongated void may have a technical effect of reducing wear of along a width of a wheel tread.

The presence of voids in the friction structure may lessen the amount of wear the brake shoe contributes to the wheel tread in some examples. The use of some void materials may contribute to conditioning, may lubricate, and/or may reduce weight. By varying the relative amount of available working surface area (brake surface) as the friction structure wears, the braking capacity of the brake shoe may be controlled. For example, if the void(s) is/are shaped so that the void cross sectional profile decreases in response to wear of the friction structure the result may be a relative increase in working surface area, and more available braking capability. Conversely, a configuration may be selected such that the exposed void cross-sectional area increases in response to wear, and that may have the effect of reducing a braking capability of the brake shoe as it wears. In one example, the relative amount of working surface available remains constant during its use and irrespective of the amount of wear. Even as the working surface area remains constant the location(s) of the void(s) and the relative wear pattern caused by the complimentary working surface on the wheel surface may change.

As shown in FIGS. 7-12, a friction device may have one or more voids in accordance with one or more examples. The one or more voids may be openings within the composite friction material or the friction structure. In one or more examples, one or more of the voids may be substantially bisected by the central axis I-I of the friction device. For example, the voids may be formed within the friction structure so as to be substantially aligned with the wheel tread of the wheel during use of the brake shoe. Alternatively, one or more of the voids may be offset from the central axis. In the examples illustrated in FIGS. 7 through 12, each of the voids has a substantially uniform circular shape but each void may alternatively have any unique and/or common shape and/or size relative to one or more other voids. The voids are essentially empty (other than atmosphere) such that the voids are openings along the brake surface and that extend from the brake surface a distance into the friction structure. For example, the voids lack material within its respective locations. This lack of the friction composite material at the voids may reduce a weight of the friction device, may reduce an amount of wear of the wheel tread from continually wearing away responsive to a braking force of the friction device being applied to the wheel.

Figure 7:
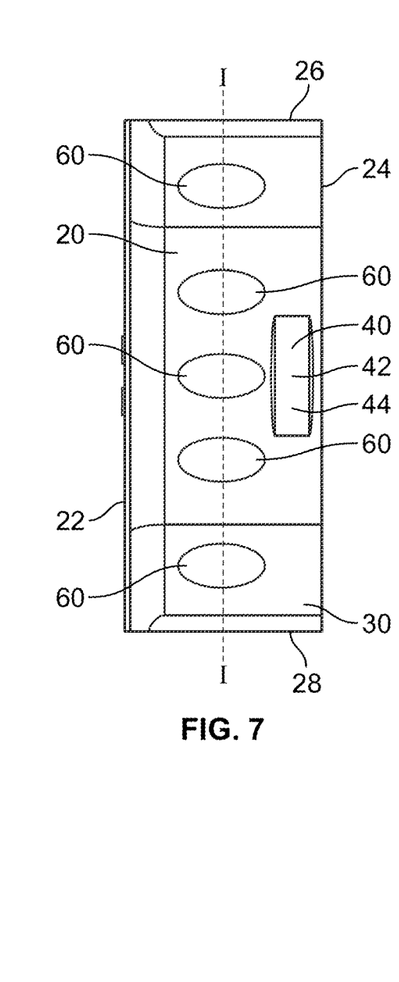
FIG. 7 is a bottom view of a friction device according to one example.
Figure 8:
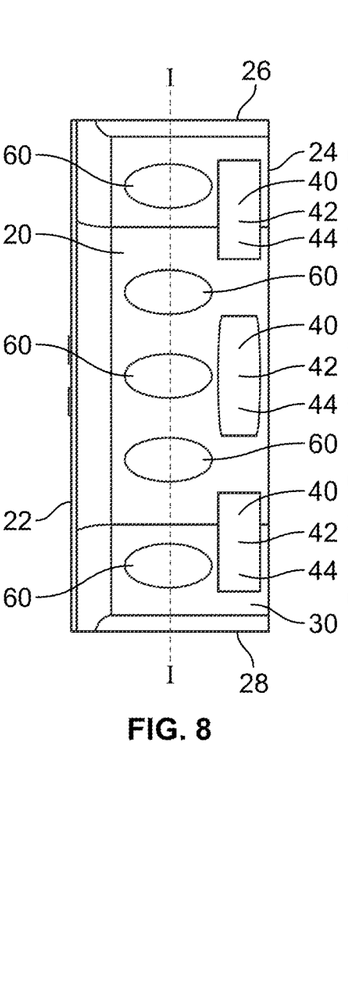
FIG. 8 is a bottom view of a friction device according to one example.
Figure 9:
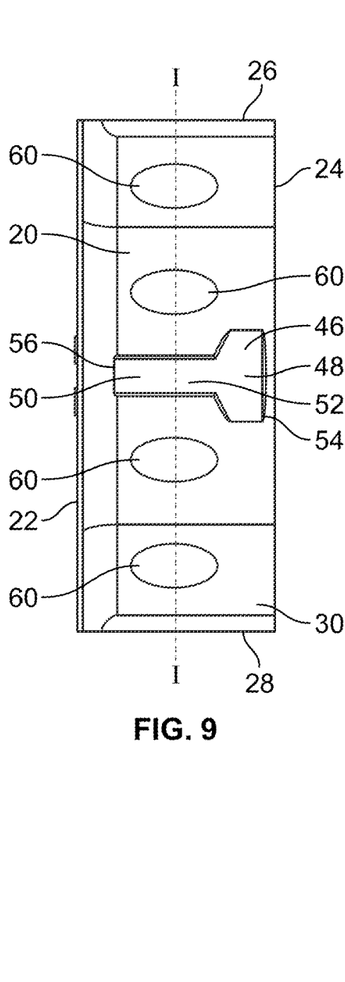
FIG. 9 is a bottom view of a friction device according to one example.
Figure 10:
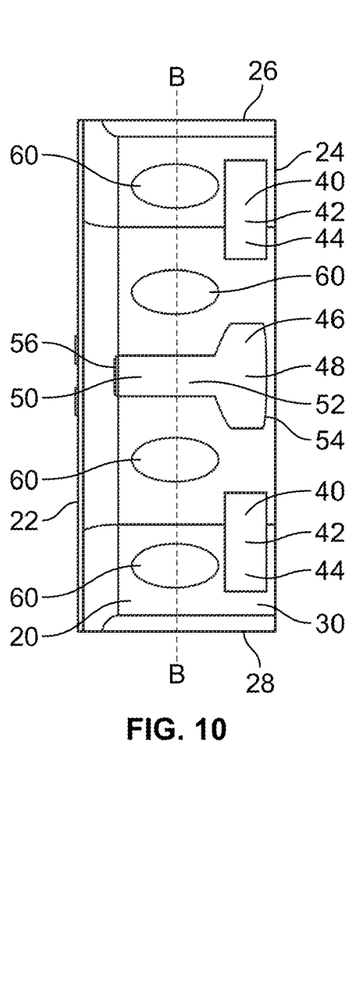
FIG. 10 is a bottom view of a friction device according to one example.
Figure 11:
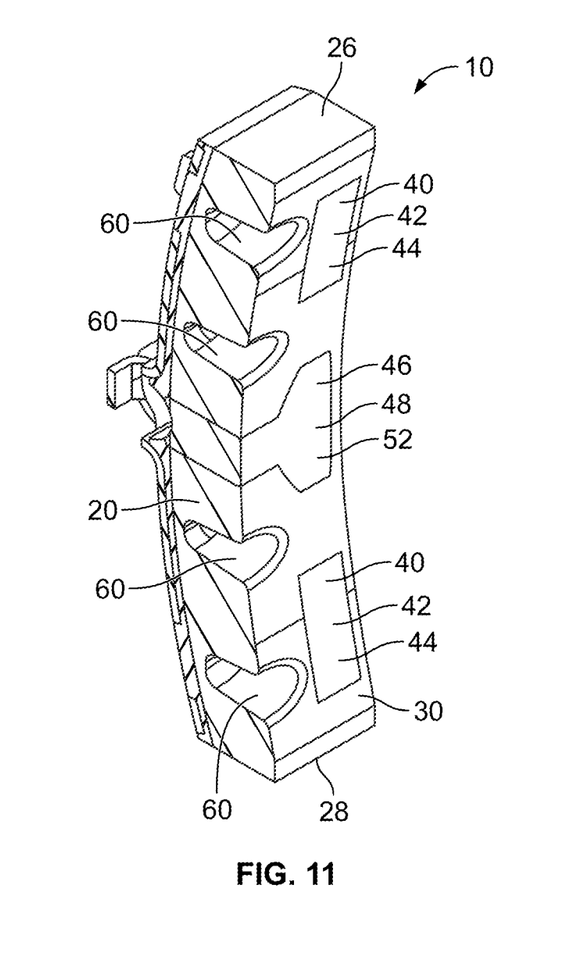
FIG. 11 is a partial cross-sectional and perspective view of the friction device shown in FIG. 10 along line B-B.

Referring to FIGS. 7-9, the friction device may include one or more voids and one or more conditioning inserts disposed within the friction structure along the brake surface. The voids and the conditioning inserts may be positioned adjacent to and substantially parallel with the rim side of the friction structure. The one or more voids may reduce an amount of wear to the wheel tread that would otherwise occur due to the braking force of the brake shoe while the conditioning inserts wear away at the wheel rim. Referring now to FIGS. 10 and 11, the conditioning insert may have a T-shape to control a location and an amount of wear to the wheel tread.

Figure 13:
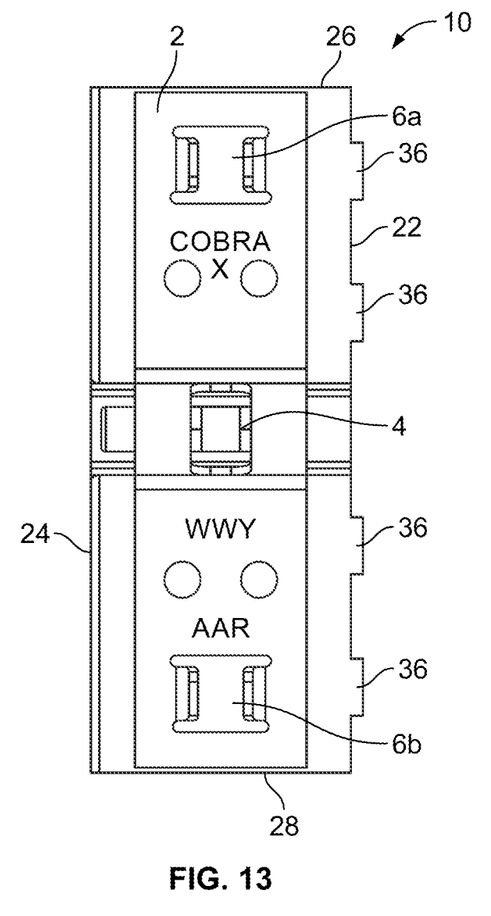
FIG. 13 is a top view of a friction device that includes an insert and an extended volume according to one example.
Figure 14:
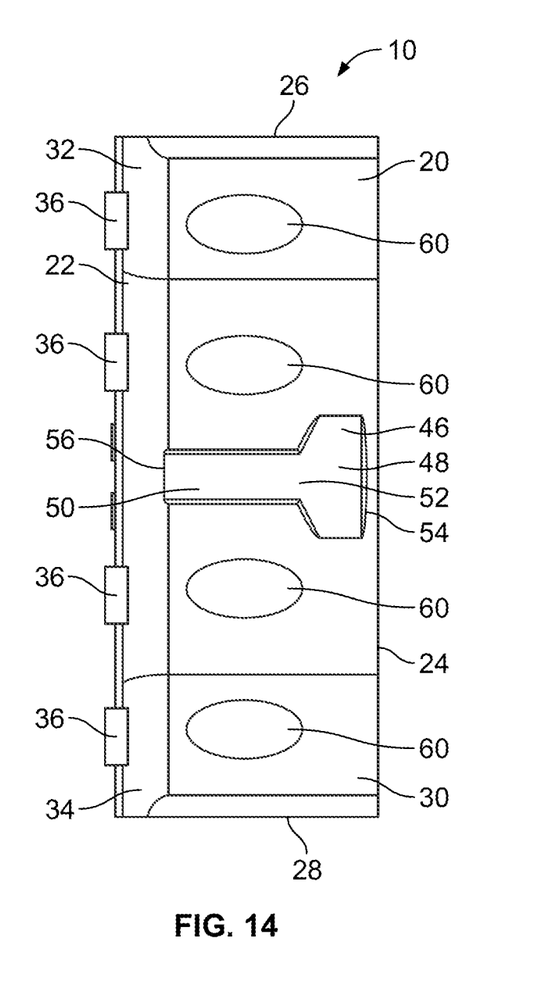
FIG. 14 is a bottom view of the friction device shown in FIG. 13.
Figure 15:
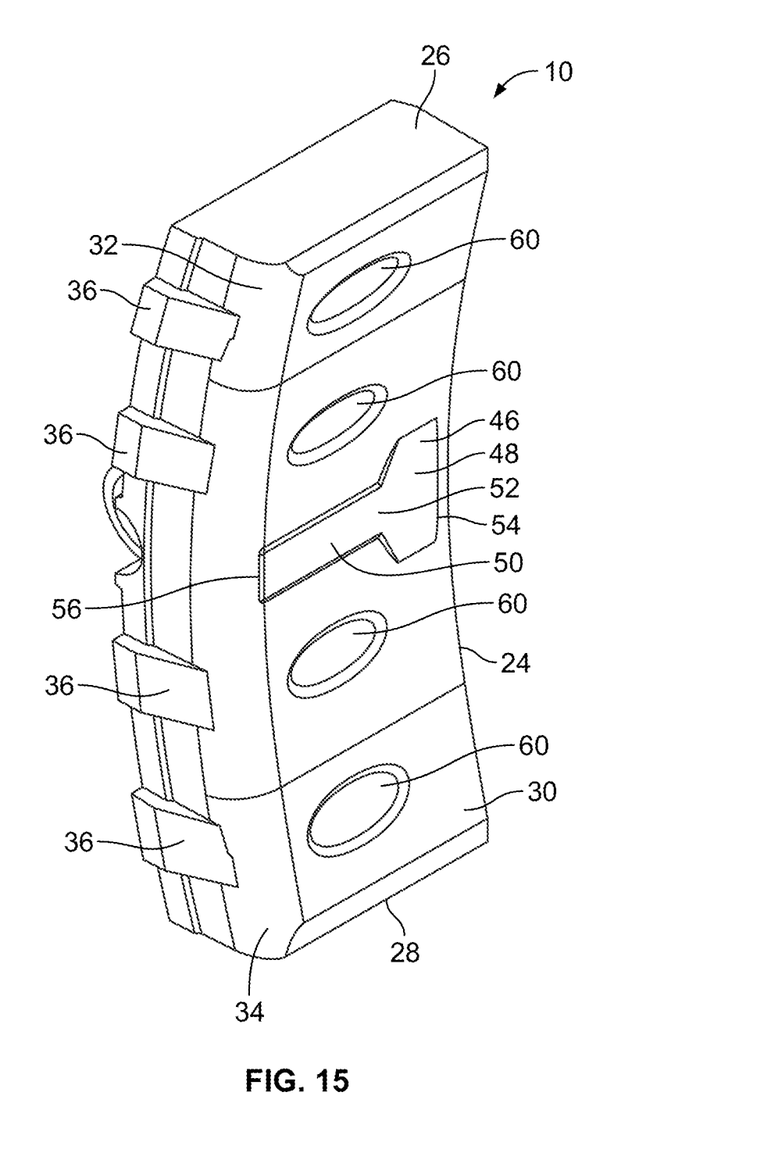
FIG. 15 is a perspective view of the friction device shown in FIG. 13.

In one or more examples, the friction device may include additional components in order to facilitate proper braking, wheel wear, and/or alignment between the friction device and the vehicle wheel. For example, FIGS. 13 through 15 illustrate a friction device that includes additional components. One of the additional components may be an extended volume 32 of the friction structure that may extend from the flange side of the friction structure and a distance away from the flange side of the friction structure. The extended volume may at least partially engage, with a root (not shown) of the wheel flange in order to improve an alignment of the friction device against the vehicle wheel. The shape and size of the extended volume may be complementary with the wheel flange root, and it may include a surface 34 that may be complementary to the wheel flange root. This complementary surface may be arcuate or curved in shape to facilitate contact between the extended volume and the flange root across the length of the surface. Optionally, the extended volume may define one or more protrusions 36 that may engage the flange root or the flange of the wheel (not shown). In one example, these protrusions may be made of the same material of the friction structure but alternatively may be made of a different material. The protrusions may improve an alignment of the friction device with the wheel of the vehicle.

During use of a brake shoe without the extended volume, complementary surface, or protrusions, the flange side of the brake shoe may slide against a wheel flange during use. This results in an improper alignment of the brake shoe against the wheel. An improper alignment occurs when the brake surface may be not properly aligned with the wheel tread, and the first and second elongated portions of the T-shaped wheel conditioning insert may be not properly aligned with the wheel rim or the wheel tread. This improper alignment may be reduced in degree, or prevented entirely by use of an extended volume, complementary surface, and/or protrusions. By having the complementary surface and the one or more protrusions engage with the wheel flange root and/or wheel flange, the flange side may be prevented from sliding against the wheel flange during use of the brake shoe. The brake surface may be biased against or forced to remain properly aligned with the wheel tread, and wheel conditioning inserts may be forced to remain properly aligned with either the wheel rim or the wheel tread.

In one or more examples of the subject matter described herein, a friction device for a wheel includes a backing plate and a friction material disposed on the backing plate to form a brake surface to engage a surface of the wheel. The friction material extends between a first end and a second end along a central longitudinal axis, and between a rim side and a flange side. A void is disposed within the friction material and extends from the brake surface a distance into the friction material. The void forms an opening of the brake surface of the friction material.

Optionally, the friction device may include a conditioning insert disposed within the friction material. The conditioning insert may include a conditioning surface configured to engage the surface of the wheel. Optionally, the conditioning surface may include a material that is different than the friction material. Optionally, the central longitudinal axis may extend through a portion of the void. The conditioning insert may be located between the void and the rim side of the friction material. Optionally, the void may be a first void. The friction device may include plural voids disposed within the friction material. Each of the plural voids may be aligned with each other and along the central longitudinal axis of the friction material. Optionally, the void may have a volume that is between about 5 percent and about 50 percent of a volume of the friction material. Optionally, the void may have a first cross-sectional profile at a location proximate the brake surface and have a different, second cross-sectional profile at a location within the friction material and a distance away from the brake surface. Optionally, the flange side of the friction material may be contoured to compliment a flange of the wheel. Optionally, at least a portion of the void may be configured to be filled with a filler material that has a composition that is different than the friction material. Optionally, the filler material may include a metallic alloy that is present in the filler material in an amount from about 5 percent to about 25 percent by weight. Optionally, the friction material may be operably coupled with the backing plate via an adhesive layer disposed between at least a portion of the backing plate and the friction material.

In one or more examples of the subject matter described herein, a friction device for use on a vehicle includes backing plate adapted to interface with a brake head of the vehicle, and a friction material operably coupled with the backing plate to form a brake surface that engages a wheel of the vehicle. A conditioning insert is disposed at least partially within the friction material. The conditioning insert including a conditioning surface configured to face the wheel. The conditioning surface includes a material that is different than the friction material. A void may be disposed within the friction material and extend from the brake surface a distance into the friction material. The void may form an opening of the brake surface of the friction material.

Optionally, the friction material may extend between a first end and a second end along a central longitudinal axis, and between a rim side and a flange side. The central longitudinal axis may extend through a portion of the void. Optionally, the void may have a volume that is between about 5 percent and about 50 percent of a volume of the friction material. Optionally, the wheel of the vehicle may engage the brake surface of the friction material outside of the void, and the wheel of the vehicle may disengage from the brake surface of the friction material at the void. Optionally, at least a portion of the void may be filled with a filler material that has a composition that is different than a composition of the friction material. Optionally, a surface of the wheel may contact the friction material outside of the void, and the surface of the wheel may contact the filler material at the void. Optionally, the void may have a volume that is between about 5 percent and about 50 percent of a volume of the friction material. Optionally, the void may be a first void. The friction device may include plural voids disposed within the friction material. Each of the plural voids may be aligned with each other and along a central longitudinal axis of the friction material.

In one or more examples of the subject matter described herein, a method includes engaging a brake surface of a friction material with a wheel surface of a wheel to slow or stop movement of the wheel, and disengaging the brake surface of the friction material with the wheel surface at a void disposed within the friction material and extending from the brake surface a distance into the friction material. The void may form an opening of the brake surface of the friction material.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

All numbers and ranges used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements. The term "at least" is synonymous with "greater than or equal to". The term "not greater than" is synonymous with "less than or equal to". As used herein, "at least one of" is synonymous with "one or more of". For example, the phrase "at least one of A, B, and C" means any one of A, B, or C, or any combination of any two or more of A, B, or C. For example, "at least one of A, B, and C" includes one or more of A alone; or one or more B alone; or one or more of C alone; or one or more of A and one or more of B; or one or more of A and one or more of C; or one or more of B and one or more of C; or one or more of all of A, B, and C. The term "includes" is synonymous with "comprises".

Spatial or directional terms, such as "left", "right", "inner", "outer", "above", "below", and the like, relate to the disclosure as shown in the drawing figures and are not to be considered as limiting as the disclosure can assume various alternative orientations. As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values. As used herein, the terms "perpendicular" or "substantially perpendicular" mean a relative angle as between two objects at their real or theoretical intersection is from 85° to 95°, or from 87° to 93°, or from 88° to 92°, or from 89° to 91°, or from 89.5° to 90.5°, or from 89.75° to 90.25°, or from 89.9° to 90.1°, inclusive of the recited values.

This written description uses examples to disclose the examples, including the best mode, and to enable a person of ordinary skill in the art to practice the examples, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A friction device for a wheel, the friction device comprising:
   a backing plate;
   a friction material disposed on the backing plate to form a brake surface configured to engage a surface of the wheel, the friction material extending between a first end and a second end along a central longitudinal axis, and between a rim side and an opposite flange side that is contoured to compliment a flange of the wheel;
   a void disposed within the friction material and extending from the brake surface a distance into the friction material, the void forming an opening of the brake surface of the friction material, wherein at least a portion of the void is configured to be filled with a filler material that has a composition that is different than a composition of the friction material, the filler material comprising a metallic alloy that is present in the filler material in an amount from about 5 percent to about 25 percent by weight, the friction material extending from the void between the first end and the second end and between the rim side and the opposite flange side, the friction material extending from the void between the void and the backing plate; and
   a conditioning insert disposed within the friction material between the rim side of the friction material and the void, the conditioning insert being spaced apart from the void, the conditioning insert having a conditioning surface configured to engage the surface of the wheel.

2. The friction device of claim 1, wherein the conditioning surface of the conditioning insert comprises a material that is different than the friction material.

3. The friction device of claim 1, wherein the central longitudinal axis extends through a portion of the void.

4. The friction device of claim 1, wherein the void is a first void, the friction device further comprising plural voids disposed within the friction material, each of the plural voids being aligned with each other and along the central longitudinal axis of the friction material.

5. The friction device of claim 1, wherein the void has a volume that is between about 5 percent and about 50 percent of a volume of the friction material.

6. The friction device of claim 1, wherein the void has a first cross-sectional profile at a location proximate the brake surface and has a different, second cross-sectional profile at a location within the friction material and a distance away from the brake surface.

7. The friction device of claim 1, wherein the friction material is operably coupled with the backing plate via an adhesive layer disposed between at least a portion of the backing plate and the friction material.

8. The friction device of claim 1, wherein the conditioning insert is a solid conditioning insert.

9. The friction device of claim 1, wherein the conditioning insert comprises one or more material or composition of materials that is different than the friction material.

10. A friction device for use on a vehicle, the friction device comprising:
    a backing plate adapted to interface with a brake head of the vehicle;
    a friction material operably coupled with the backing plate to form a brake surface that engages a wheel of the vehicle, the friction material having a rim side and an opposite flange side that is contoured to compliment a flange of the wheel;
    a conditioning insert disposed at least partially within the friction material, the conditioning insert including a conditioning surface configured to face and engage the wheel, the conditioning surface comprising a material that is different than the friction material; and a void disposed within the friction material and extending from the brake surface a distance into the friction material, the void forming an opening of the brake surface of the friction material, wherein at least a portion of the void is configured to be filled with a filler material that has a composition that is different than a composition of the friction material, the filler material comprising a metallic alloy that is present in the filler material in an amount from about 5 percent to about 25 percent by weight, the friction material extending from the void between a first end and a second end and between the rim side and the opposite flange side, the friction material extending from the void between the void and the backing plate, wherein the conditioning insert is disposed between the opposite flange side of the friction material and the void, the conditioning insert being spaced apart from the void.

11. The friction device of claim 10, wherein the friction material extends between a first end and a second end along a central longitudinal axis, and between the rim side and the opposite flange side, wherein the central longitudinal axis extends through a portion of the void.

12. The friction device of claim 10, wherein the void has a volume that is between about 5 percent and about 50 percent of a volume of the friction material.

13. The friction device of claim 10, wherein the wheel of the vehicle is configured to engage the brake surface of the friction material outside of the void, and the wheel of the vehicle is configured to disengage from the brake surface of the friction material at the void.

14. The friction device of claim 10, wherein a surface of the wheel is configured to contact the friction material outside of the void, and the surface of the wheel is configured to contact the filler material at the void.

15. The friction device of claim 14, wherein the void has a volume that is between about 5 percent and about 50 percent of a volume of the friction material.

16. The friction device of claim 10, wherein the void is a first void, the friction device further comprising plural voids disposed within the friction material, each of the plural voids being aligned with each other and along a central longitudinal axis of the friction material.

17. A method comprising:

engaging a brake surface of a friction material having a conditioning insert in the friction material with a wheel surface of a wheel to slow or stop movement of the wheel, the friction material extending between a first end and a second end along a central longitudinal axis, the friction material having a rim side and an opposite flange side that is contoured to compliment a flange of the wheel; and disengaging the brake surface of the friction material with the wheel surface at a void disposed within the friction material and extending from the brake surface a distance into the friction material, the void forming an opening of the brake surface of the friction material with the conditioning insert disposed between and spaced apart from the void and the rim side of the friction material, at least a portion of the void configured to be filled with a filler material that has a composition that is different than a composition of the friction material, the filler material comprising a metallic alloy that is present in the filler material in an amount from about 5 percent to about 25 percent by weight, the friction material extending from the void between the first end and the second end and between the rim side and the opposite flange side, the friction material extending from the void between the void and a backing plate, the backing plate positioned opposite the brake surface.

\* \* \* \* \*